(12) United States Patent
Sadaghiani et al.

(10) Patent No.: US 10,341,374 B1
(45) Date of Patent: Jul. 2, 2019

(54) SYSTEMS AND METHODS DETECTING AND MITIGATING ANOMALOUS SHIFTS IN A MACHINE LEARNING MODEL

(71) Applicant: Sift Science, Inc., San Francisco, CA (US)

(72) Inventors: Fred Sadaghiani, San Francisco, CA (US); Keren Gu, San Francisco, CA (US); Vera Dadok, San Francisco, CA (US); Alex Paino, San Francisco, CA (US); Jacob Burnim, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 16/196,242

(22) Filed: Nov. 20, 2018

(51) Int. Cl.
| | |
|---|---|
| *G06F 21/60* | (2013.01) |
| *H04L 29/06* | (2006.01) |
| *G06F 9/54* | (2006.01) |
| *G06N 20/00* | (2019.01) |
| *G06F 8/60* | (2018.01) |
| *G06K 9/62* | (2006.01) |

(52) U.S. Cl.
CPC .......... *H04L 63/1425* (2013.01); *G06F 8/60* (2013.01); *G06F 9/542* (2013.01); *G06K 9/6252* (2013.01); *G06N 20/00* (2019.01); *H04L 63/1441* (2013.01)

(58) Field of Classification Search
CPC ......... H04L 63/14; H04L 29/06; G06F 21/60; G06F 21/56
See application file for complete search history.

(56) References Cited

U.S. PATENT DOCUMENTS

| | | | |
|---|---|---|---|
| 10,108,962 B1* | 10/2018 | Sadaghiani | ........... G06F 16/285 |
| 10,181,032 B1* | 1/2019 | Sadaghiani | ............ G06N 20/00 |
| 2016/0065594 A1* | 3/2016 | Srivastava | .......... H04L 63/1433 |
| | | | 726/23 |

* cited by examiner

*Primary Examiner* — Izunna Okeke
(74) *Attorney, Agent, or Firm* — Jeffrey Schox; Padowithz Alce

(57) ABSTRACT

Systems and methods include implementing a remote machine learning service that collects digital event data; collecting incumbent digital threat scores generated by an incumbent machine learning model and successor digital threat scores generated by a successor digital threat machine learning (ML) model; implementing anomalous-shift-detection that detects whether the successor digital threat scores of the successor digital threat ML model produces an anomalous shift; if the anomalous shift is detected by the machine learning model validation system, blocking a deployment of the successor digital threat model to a live ensemble of digital threat scoring models; or if the anomalous shift is not detected by the machine learning model validation system, deploying the successor digital threat ML model by replacing the incumbent digital threat ML model in a live ensemble of digital threat scoring models with the successor digital threat ML model.

16 Claims, 9 Drawing Sheets

Sampling Digital Threat Scores S210

Generating Threat Score Distribution S220

Identifying Quantiles S225

Sampling Digital Threat Scores of Successor Model S230

Generating Threat Score Distribution of Successor Model S240

Remapping Digital Threat Scores S250

Testing Model Behavior S255

Returning Digital Threat Scores S260

*FIGURE 2*

SYSTEMS AND METHODS DETECTING AND MITIGATING ANOMALOUS SHIFTS IN A MACHINE LEARNING MODEL

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
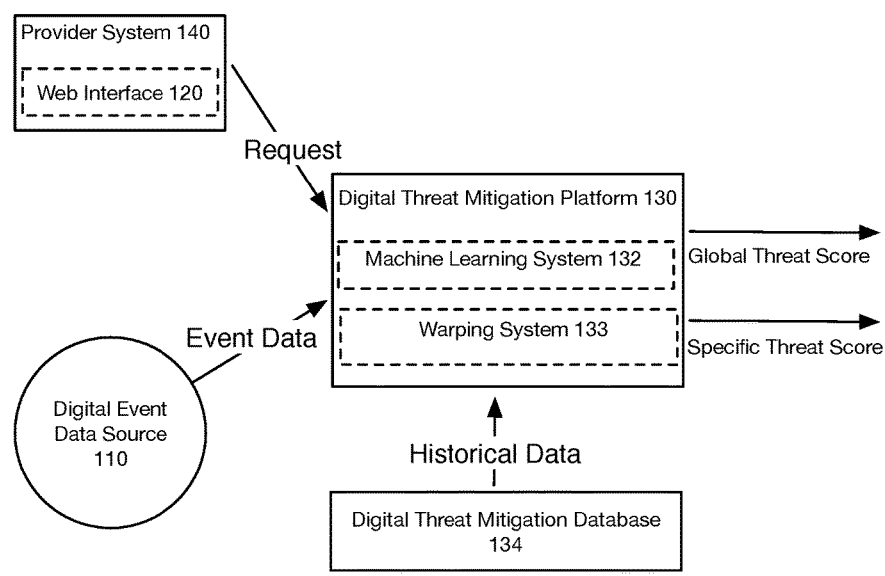
FIG. 1 illustrates a schematic representation of a system in accordance with one or more embodiments of the present application.
Figure 3:
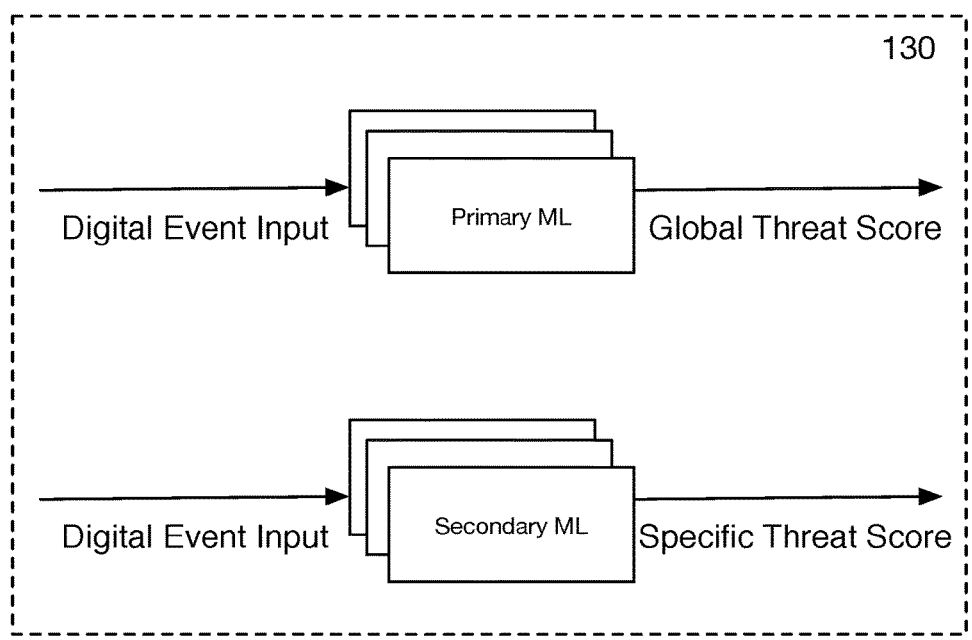
FIG. 3 illustrates an example schematic of a digital threat mitigation platform in accordance with one or more embodiments of the present application.
Figure 4:
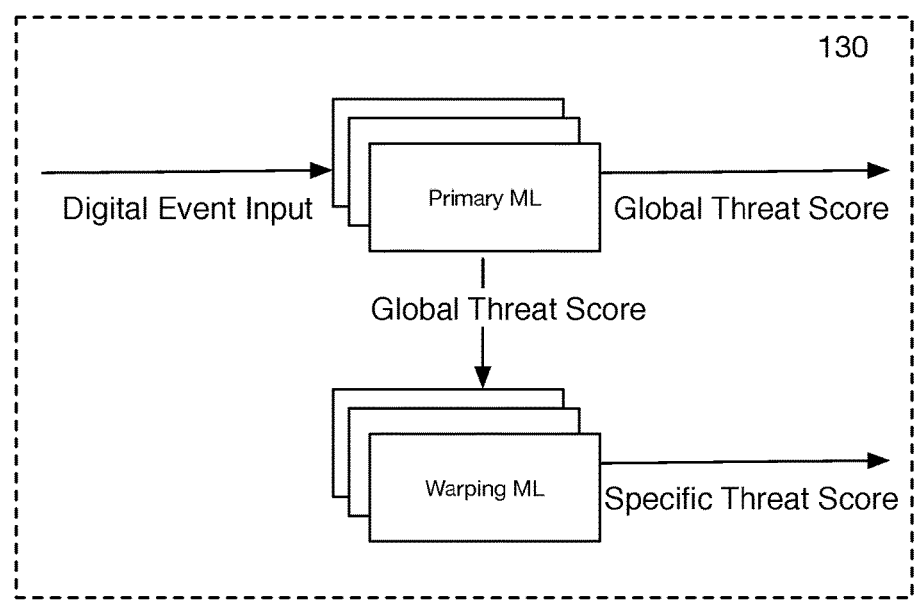
FIG. 4 illustrates an example schematic of a digital threat mitigation platform in accordance with one or more embodiments of the present application.
Figure 5:
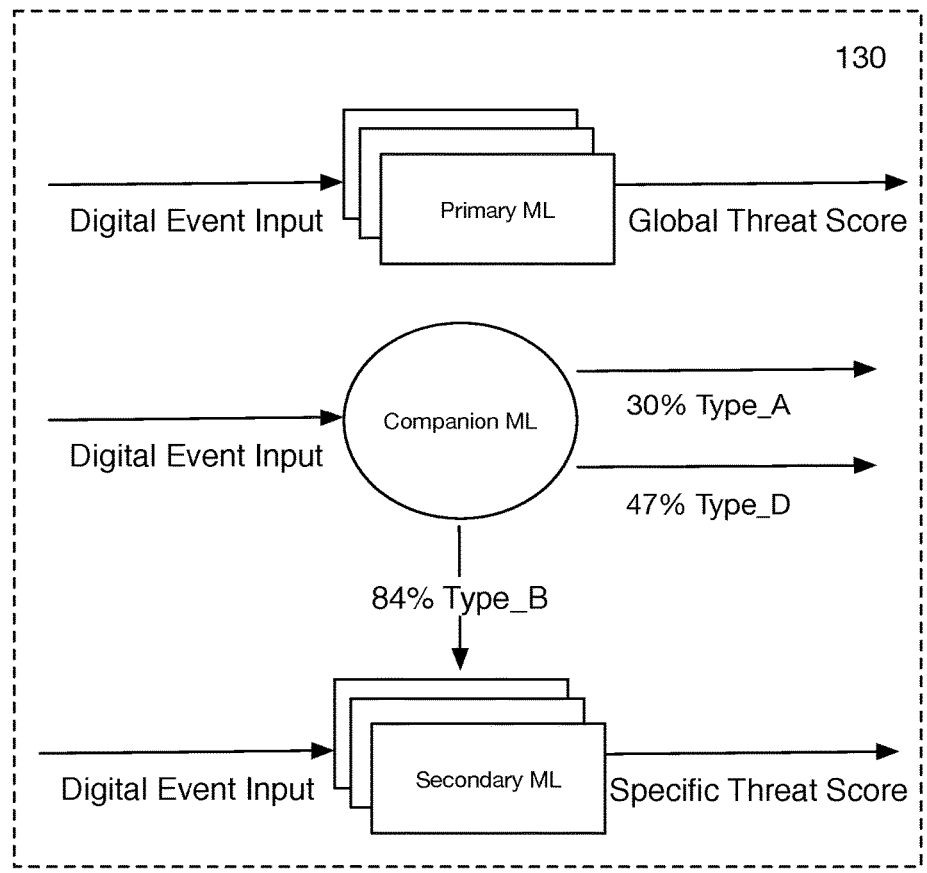
FIG. 5 illustrates an example schematic of a digital threat mitigation platform in accordance with one or more embodiments of the present application.
Figure 6:
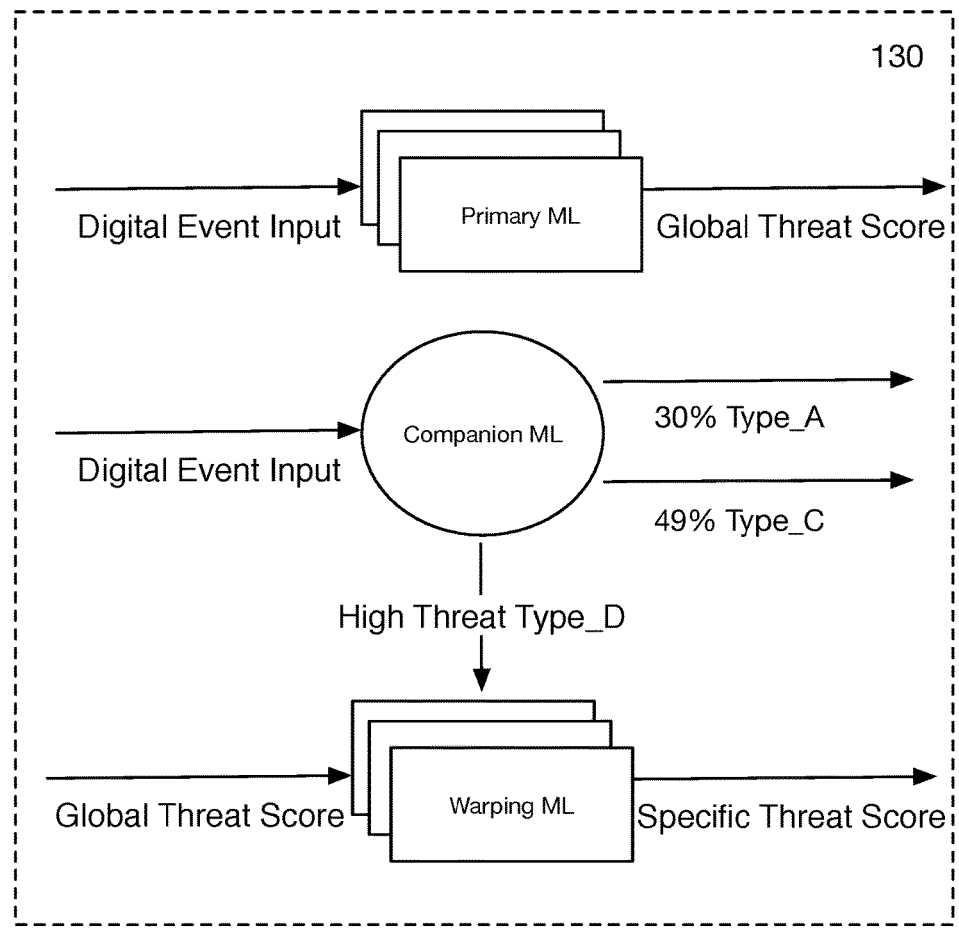
FIG. 6 illustrates an example schematic of a digital threat mitigation platform in accordance with one or more embodiments of the present application.

The following description of the preferred embodiments of the present application are not intended to limit the inventions to these preferred embodiments, but rather to enable any person skilled in the art to make and use these inventions.

1. Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

Additionally, recognizing that in some circumstances service providers that provide online and/or digital resources to users may need to mitigate or prevent multiple forms of digital fraud and/or digital abuse simultaneously, the embodiments of the present application enable the generation of a global digital threat score and a plurality of specific digital threat scores for varying, known digital fraud or abuse types. Accordingly, while the global digital threat score may indicate to the service provider a general indication of the existence of digital fraud and/or digital abuse in digital events data, the specific digital threat scores for the plurality of digital abuse types function to specifically identify a type of fraud or abuse that is being committed in a digital events dataset. These specific indications allow the service provider and/or the digital threat mitigation platform to implement digital threat mitigation or prevention actions that effectively address the specific digital fraud or abuse.

2. New Model Validation/Safety Net Overview

As digital threats evolve, it is also necessary that the digital threat mitigation platform evolve the underlying digital threat detecting machine learning models that generally function to identify digital events that may involve a level of digital threat or digital abuse. However, changing the underlying digital threat machine learning models may adversely affect the distribution of threat scores produced by the digital threat mitigation service for service providers and/or customers using the digital threat mitigation platform as the thresholds implemented by service providers for detecting digital threats and non-digital threats may remain constant.

Accordingly, a change in an underlying digital threat machine learning model implemented digital event classification for a specific service provider using the digital threat detection services of the digital threat mitigation platform may cause unexpected shifts or unusually large shifts in the classification proportions of users of the services of the service provider or the classification proportions of events involving the services of the service provider that the machine learning model scores or predicts to be or involve a threat. That is, the digital threat scores generated by a new or a target successor model that is replacing an existing or incumbent model of a specific service provider may produce digital threat scores with a different score distribution than a prior score distribution of the incumbent model and in the context of using fixed evaluation thresholds for initiating automated reactions (e.g., blocking an order, banning a user, etc.) to events or users, this may cause large shifts in the proportion of events or users that receive the automated reactions. Accordingly, this sensitivity to the shifts of a number of automated reactions and/or non-automated reactions (e.g., manual reviews) that is experienced by service providers is primarily a result of a lack of an update to the fixed automated decisioning thresholds even though the underlying machine learning scoring model has been changed.

In some embodiments, the sensitivity level that may be experienced by a service provider due to a migration from an old machine learning model to a new machine learning model may be measured or estimated. The measured sensitivity may be used the machine learning system of the present application to trigger a calibration of a new machine learning model being installed for a specific service provider. For instance, a number of automated decision for a given dataset may be calculated for each of an old and new machine learning model. If the machine learning system measures that an increase or decrease of a number of automated decisions has increased or decreased based on the scoring outcomes of the new machine learning model at or beyond one or more sensitivity thresholds, the machine learning system may determine that the sensitivity level experienced by a service provider may be significant and therefore, trigger a calibration of a proposed new machine learning model prior to enabling live scoring with the new machine learning model.

Thus, while the new digital threat scoring model may produce new and more accurate digital threat scores, the predetermined or fixed automated decisioning thresholds of a specific service provider may not have been updated or changed to consider the changes in an underlying threat score distribution of the new digital threat scoring machine learning model. As a result, significant disruptions in the ability of a service provider or the platform to accurately perform digital threat detection may be caused because too few or too large digital threat detections in specific classification classes may be identified as a result of the new digital threat scores of the new digital threat model not being in line with the prior or maintained digital threat detection thresholds (i.e., the automated decisioning thresholds). It shall be noted that automated decisioning thresholds for specific services providers may not necessarily be known to a machine learning service and/or the digital threat mitigation platform that performs one or more of the methods described herein. Nevertheless, the machine learning service or other system implementing the methods may function to calibrate successor machine learning models without an express knowledge of the automated decisioning thresholds.

Additionally, because the digital threat mitigation platform may function to produce many model changes and updates (e.g., hundreds or thousands of model changes and updates), it may be extremely difficult to continually determine proper updates to the thresholds used for detecting digital threat based on the digital threat scores produced by the new digital threat scoring models.

The embodiments of the present application, however, provide systems and methods that enable the evolution and changes to an underlying machine learning model for detecting digital threats while minimizing or ameliorating the probabilities of disruption in the detection of digital threat events using prior or unchanged digital threat detection thresholds applied against new digital threat scores of new digital threat models being implemented in the underlying machine learning model change. In this way, while a service provider or the like may be migrated to an improved digital threat scoring machine learning model that may detect digital threats with higher accuracy and faster than a prior model, confusing disruptions in the digital threat detection capabilities are mitigated by preserving a digital threat score distribution between a prior digital threat scoring machine learning model and the new digital threat scoring machine learning model.

3. System for Digital Fraud and/or Abuse Detection and Threat Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables users to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating endpoint health intelligence and/or other data relevant to the system 100.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores.

Additionally, as shown in FIG. 2-FIG. 6, the systems and methods described herein may implement the digital threat mitigation platform in accordance with the one or more embodiments described in the present application as well as in the one or more embodiments described in: [1] U.S. patent application Ser. No. 15/653,373, [2] U.S. patent application Ser. Nos. 15/653,354, and 15/842,379, which are incorporated herein in their entireties by this reference.

4. Method for Anomalous Shift Detection and Mitigation Resulting from a New Machine Learning Model As shown in FIG. 2, the method 200 includes collecting digital event data S210, configuring an evaluation scheme and/or system architecture for evaluating a new machine learning model S220, detecting anomalous shifts in threat scores produced by a successor ML model S230, identifying an unexpected anomalous shift S240, and validating or not and/or deploying a successor ML model S250.

The method 200 preferably functions to enable a detection of anomalous shifts in threat scoring distributions for associated service providers based on an introduction of a new machine learning model for producing digital threat scores for online activities and/or transactions associated with the service providers. The anomalous shifts in threat scoring distributions, if unexpected, may cause undue detection of online or digital activity as digital threats or an insufficient detection of online or digital activity as digital threats.

Accordingly, if an anomalous shift in threat scoring distributions of a new machine learning model is detected for a given service provider or customer of the digital threat mitigation service, the method 200 may function to surface the affected customer or service provider and provide an opportunity to calibrate the new machine learning model in advance of a live introduction to mitigate and/or eliminate the anomalous shift(s) in a threat scoring distribution for the given service provider. Additionally, or alternatively, if an anomalous shift in a threat scoring distribution is detected for a given service provider or customer of the digital threat mitigation service, the method 200 may provide an opportunity to coordinate a seamless migration, with a given service provider or customer of the digital threat mitigation service, to the new machine learning model by implementing strategies (e.g., adjusting or re-calibrating threat detection thresholds, etc.) for mitigating the anomalous shift(s) in the threat scoring distribution resulting from a potential or live introduction of the new machine learning model.

In a preferred embodiment, the method 200 is implemented in a live and/or online (not offline) system that is actively connected to the Internet (or one or more networked web servers, etc.) and performs digital threat detection based on live digital events, live threat scoring requests, and the like. In such preferred embodiments, while a prior or an incumbent machine learning model is used to ingest digital event data and produce live threat scores, a second (raw/uncalibrated) new or successor machine learning model may be implemented simultaneously in a shadow mode during a period in which the same digital event data is ingested at the incumbent and successor ML models and digital threat scores may be produced by the successor ML model that are not returned or exposed for the digital events data under evaluation, as discussed in more detail in a section below.

4.1 Digital Event Data Acquisition

S210, which includes collecting digital event data, functions to collect digital event data to be used as input into a digital threat machine learning system (or service). In some embodiments, in response to receiving a request for a global digital threat score or a specific digital threat score, S210 may collect digital event data from one or more data sources associated with the service provider making the request. Additionally, or alternatively, S210 may function to collect global digital event data from a global digital event databank or the like that includes digital event data from a plurality of different sources other than the service provider making the request.

In one variation of S210, contemporaneously or at a same time of making the request for a digital threat score, the service providing making the request may transmit (e.g., via a network or the like), from one or more data repositories of the service provider to the digital threat mitigation platform, the digital event data that is the subject of evaluation for threat scoring. In some embodiments, the service provider transmits the digital event data immediately after making the request for the global digital threat score. The digital event data may be collected at a digital events API of the digital threat mitigation platform that is specifically configured to ingest digital event data and one or more portions of the digital event data throughout the systems of the digital threat mitigation platform.

The collected digital event data from the one or more data sources associated with the service provider may include historical and/or current (real-time or recent) digital event data associated with events, actions, transactions, and various activities occurring via websites, web applications, mobile applications, and various digital resources of the service provider. The collected digital event data may be structured and/or organized in a meaningful fashion to include metadata that describes the digital source(s) of the digital event data or any suitable attribute of the digital event data.

The collected digital event data may additionally include or be appended with user identification data such as data that identifies one or more users and/or one or more user accounts involved in the digital events and/or activities of the collected digital event data transmitted by the service provider. The user identification data may be used by the digital threat mitigation platform to identify and collect additional and/or historical user (or user account) data. Specifically, the digital threat mitigation platform may convert all or portions of the user identification data into queries for searching one or more database having additional and/or historical user data stored therein. The additional and/or historical user data may be specific to the one or more users and/or user accounts identified in the request from the service provider. Additionally, or alternatively, the additional and/or historical user data may be general digital event data about the users and user accounts of the service provider. The historical user data may be historical digital event data that was submitted in the past by the service provider making the request for the global digital threat score. That is, the historical user data may have been submitted with a historical request by the service provider and stored in one or more databases associated with or maintained by the digital threat mitigation platform. Additionally, or alternatively, the historical user data may originate from other service providers that may have submitted digital event data to the digital threat mitigation platform in the past.

The collected digital event data may include global digital event data acquired from a global digital event database. The global digital event database may include an aggregation of digital event data from a plurality of digital event sources. The plurality of digital event sources may include various other service providers. The global digital event data may be anonymized to prevent leakage of personally identifiable information. This additionally collected global event data may be considered assistive data that may be used as additional input into the machine learning systems of the digital threat mitigation platform to improve the accuracy of the digital threat scoring and predictions thereof.

The type and/or kind of global digital event data collected from the global digital event database may be defined by sub-requests and the specific digital threat types identified therein. For instance, if a sub-requests (for producing a specific digital threat score) of a service provider received at the events API include two sub-requests for producing digital threat scoring for digital threat type_A and digital threat type_B, the events API may, in turn, convert the respective sub-requests into probes (e.g., convert sub-request digital threat type_B into digital threat type_B probe) that are sent into the global digital event data database to seek and retrieve digital event data that corresponds to or that is assistive in identifying or classifying digital threat type_A and digital threat type_B.

The events API may additionally or alternatively convert the respective sub-requests into respective queries for collecting the additional assistive digital event data. Accordingly, the sub-requests of the requests for specific digital threat scoring may act as triggers for collecting additional digital event data and/or assistive data from different sources other than from data repositories maintained or accessible to the service provider.

Accordingly, the collected digital event data may include digital event data originating directly from the service provider as well as global digital event data from other digital event sources (e.g., other service providers, etc.) and historical digital event data associated with one or more users or users' accounts associated with the request for the global digital threat score.

It shall be noted that S210 may additionally or alternatively function to generate or collect any additional data associated with the collected digital threat scores including a time range or period over which all the digital threat scores were collected, a time of capture or timestamp for each of the digital threat scores, a first and last score time, a number of scores captures, and the like. These additional digital threat score data may also be stored in association with respective digital threat scores, preferably as metadata.

4.2 New (Successor) ML Model Evaluation

S220, which includes configuring an evaluation scheme and/or system architecture for evaluating a new machine learning model, functions to configure one or more aspects of the digital threat mitigation threat platform (service) that enables an evaluation of a successor machine learning model. As discussed in more detail below, a new machine learning model may sometimes be referred to herein as a successor machine learning (ML) model and a prior or pre-existing machine learning model that is used one or more live implementations for digital threat scoring may be referred to herein as an incumbent machine learning (ML) model.

The incumbent ML model may be a machine learning model that is specifically configured to evaluate digital events (e.g., online transactions, online activities, etc.) and/or digital actors (users) and generate one or more of a threat classifications and a digital threat scores based on the features of the digital events and/or digital actors. Accordingly, a system (e.g., system 100) implementing the incumbent ML model may function to implement or operate a feature extractor that identifies relevant features of the digital events data, extract or collect those features from the digital events data, and provide the extracted features as input machine learning input into the incumbent ML model. Thus, the system (or platform) may generate digital threat scores in accordance with the one or more embodiments described in U.S. patent application Ser. No. 15/653,373, which is incorporated by reference in its entirety.

Accordingly, S220 may enable the method 200 and/or system implementing the method 200 to capture scores for building score distributions for each of an incumbent ML model and a subject successor ML model that may be scheduled to eventually replace (or sometimes, augment) the incumbent ML model. Accordingly, the successor ML model, if validated, may be an emergent scoring model that may function to succeed the incumbent ML model for producing digital threat scores for a specific service provider or the like.

In a first implementation, S220 may function to enable a source of digital event data, such as an events API, to source or route digital event data to both the incumbent ML model and the successor ML model. In this first implementation, S220 may function to install the successor ML model into a live (or online) ensemble or composition of machine learning models, which includes the incumbent ML model, that is used for generating digital threat scores. In some embodiments, the digital threat scores generated by the ensemble of live machine learning models (that includes the incumbent and successor models) may be written or stored within an exposable scores table (or the like) and exposed and/or returned to a customer or service provider associated with the digital event data associated with the digital threat scores.

In this first implementation, S220 may function to source or route a portion or a fraction of the digital event data traffic collected by the source of the digital event data to the successor ML model. For instance, of the total traffic (i.e., 100% of traffic) collected by an events API or the like, three-percent (3%) of the total traffic of digital event data may be sourced or devoted to the successor model while another fraction of the total traffic of digital event data is sourced to the incumbent model (similarly to any other any model within the ensemble of machine learning models). it shall be noted that any suitable fractional value or portion of the collected digital event data may be sourced as input into the successor ML model for generating digital threat scores.

Resultantly, while S220 may function to source digital event data to each of the incumbent ML model and the successor ML model when implemented in a live ensemble of threat scoring models, the datasets sourced to each of the incumbent ML model and the successor ML model may differ. For instance, each of the incumbent ML model and the successor ML model may receive datasets including varying customers and/or digital event activities (i.e., different sets of users of a service provider with unpaired data, etc.).

In a second implementation, S220 may function to enable a source of digital event data, such as an events API, to source digital event data to the incumbent ML model operating in a live ensemble of threat scoring models and to the successor ML model operating in a (not live) shadow mode. In some embodiments, the successor ML model may be installed in a shadow ensemble of other ML models (e.g., other successor ML models or the like) operating in shadow mode. Preferably, the digital threat scores generated in the live ensemble of threat scoring models may be exposed to customers and/or service providers while the digital threat scores generated by the successor ML model operating in the shadow mode may not be exposed to customers and/or service providers of the digital threat mitigation platform. Additionally, or alternatively, digital threat scores generated by the successor ML model may be written to a private database or reservoir while the digital threat scores generated by the incumbent ML model may be written to an exposable database in which the threat scores therein may be publicly returned via an API or the like to customers and/or service providers for a given digital event.

Accordingly, in this second implementation, S220 may function to operate the successor ML model in parallel or simultaneously with the incumbent ML model. Accordingly, S220 may function to provide or route a duplicate of the digital event data that is collected by an events API (or the like) to the live ensemble of threat scoring models to the successor ML model, preferably, operating in the shadow ensemble of threat scoring models. Thus, in this second implementation, each of the incumbent machine learning models in the live ensemble of threat scoring models and each of the successor (new) machine models in the shadow ensemble of threat scoring models may function to receive digital event data obtained over a same period for producing digital threat scores. It shall be noted that while S220 may function to source the same (amount of) digital event data to each of the live ensemble of threat scoring models and the shadow ensemble of threat scoring models, S220 may alternatively function to transmit only a fraction of the traffic collected by the event API or the like to the shadow ensemble of threat scoring models.

In a variation of this second implementation, S220 may function to provide paired digital event data to both the successor ML model and the incumbent ML model. That is, S220 may operate the successor ML model such that each dataset (e.g., extracted features, metadata, etc.) for evaluation of a given digital event that is provided as input into the incumbent ML model may also be provided to the successor ML model and preferably, provided as paired (user or activity) data input comprising a same set of users and associated digital event data for the same set of users. S220 may additionally, or alternatively provide the paired data to each of the incumbent and the successor ML models in a same chronological order. In this way, both the incumbent and the successor models are generating digital threat scores on comparable or same data inputs rather than varying digital event data (i.e., unpaired data or different sets of users, etc.). Thus, digital threat scores produced by each of the incumbent ML model and the successor ML model may be comparable in the sense that their respective digital threats scores find basis in the same datasets without necessarily having a same resulting threat score value. In a preferred embodiment, S220 may function to output, as paired scores, each incumbent threat score from the incumbent ML model and each successor threat score from the successor ML model. In such preferred embodiment, paired digital event data derived from a same set of users may be provided as input into both the incumbent and successor ML models and the threat scores produced by each of the incumbent and successor ML model may be chronologically paired together (i.e., paired scores). For instance, a first incumbent threat score may be paired together with a first successor threat score and so on. Accordingly, the paired threat scores may be used to generate paired distributions, paired confidence intervals, and the like that allows for direct comparisons between the distributions, intervals, and the like of the incumbent and successor ML models. Accordingly, for one or more embodiments of the present application as further described below (with respect to S230-S250), it may be assumed that paired data is as input into the incumbent and successor ML models and that paired scores from the distinct models may be used in the statistical analysis or varying analysis and anomalous-shift detection analysis.

A technical benefit of using paired data and paired scores in this manner includes improved accuracy in one or more statistical comparison tests implemented between the threat score values of the incumbent and the successor ML models. Specifically, the paired nature in the data and threat scores reduces noise in statistical models associated with the incumbent and successor models and further, results in tighter confidence intervals for more accurately detecting anomalous shifts.

4.3 Anomalous-Shift-Detection

S230, which includes detecting anomalous shifts in threat scores produced by a successor ML model, functions to analyze threat score values and identify anomalous shifts in threat score of a potential successor ML model. In a preferred embodiment, S230 may function to build threat score distributions for each of the successor ML model and the incumbent ML model and perform anomalous-shift-detection analysis based on an application of one or more statistical test and/or difference testing between the score distributions of the incumbent and successor ML models. In such preferred embodiment, S230 may function to build a threat score distribution for each of the incumbent ML model and the successor ML model using threat scores generated and stored while operating the successor ML model in a shadow mode alongside operating the incumbent model a live ensemble of threat scoring models, as discussed in S220.

Additionally, or alternatively, S230 may function to generate a threat score distribution for each of the incumbent ML model and the successor ML model based on a same customer identifier or service provider identifier such that generated score distributions are based on threat scores produced for a specific customer. In another implementation, S230 may function to generate a threat score distribution for each of the incumbent ML model and the successor ML model based on threat scores produced for a same set of users (possibly operating with different customers or service providers of the digital threat mitigation platform). In a further implementation, S230 may function to generate a threat score distribution for each of the incumbent ML model and the successor ML model based on based on threat scores produced for a same set of users of a specific customer.

In some embodiments, S230 functions to apply a cumulative distribution function to the digital threat scores of each of the incumbent ML model and the successor ML model to generate a cumulative distribution for each of their respective digital threat scores. In this way, the digital threat scores for each of the incumbent ML model and the successor ML model may be illustrated in a score distribution in which the digital threat scores are ranked in an ascending (or descending) manner and bounded between zero and one [0,1] (or [0, 100]). Thus, irrespective of the time at which the digital threat scores were generated by the respective threat score models, the generated score distribution provides a comprehensible order to the digital threat scores that enables a further identification or determination of quantiles of the score distribution, if necessary.

4.3.1 Overlapping Coefficient

In a first implementation, S230 may function to implement an anomalous shift detection analysis that includes measuring an area of overlap between distribution curves of the incumbent ML model and the successor ML model to identify whether there exists an anomalous shift in the distribution of the successor ML model. In this first implementation, S230 may function to collect the threat score values generated by each of the successor ML model and the incumbent ML model (in S220) and generate a probability distribution for each of the incumbent and successor ML models based on their respective values.

Figure 7:
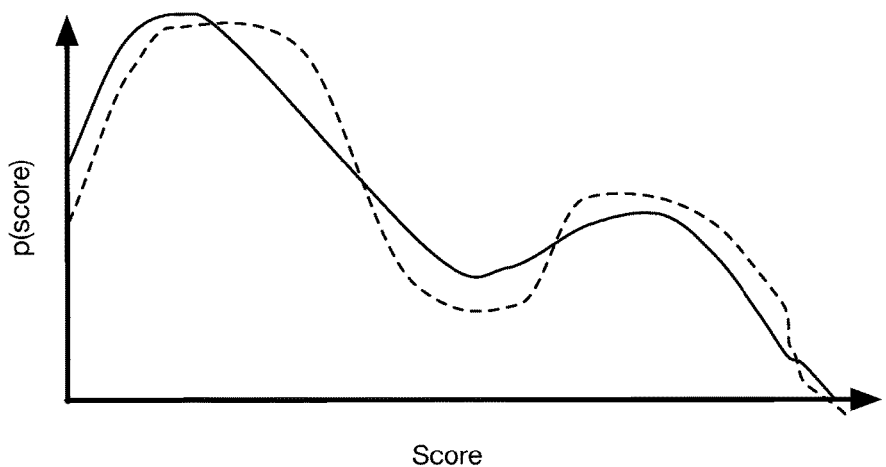
FIG. 7 illustrates an example anomalous shift detection using an overlapping coefficient between an old and new model in accordance with one or more embodiments of the present application.

Further, in this first implementation, S230 includes S231, which functions to generate a probability distribution model for each of the incumbent and the successor ML models. Specifically, S231 may function to plot a distribution curve for each of the incumbent and successor ML models based on the collected digital threat scores for each of the incumbent and successor ML models, as shown by way of example in FIG. 7. Preferably, S231 functions to generate a cumulative distribution for threat scores of each of the incumbent and successor ML models. However, it shall be noted that S231 may function to generate any suitable plot and/or generate a score distribution for each of the incumbent and the successor ML models using any suitable probability distribution function. Additionally, or alternatively, S231 may function to build any suitable representation or illustration of the threat scores generated by the incumbent and the successor ML models, including, but not limited to, histograms, density plots, or any suitable plot.

Additionally, or alternatively, S230 may include S232, which includes measuring variances or difference values between score distributions, functions to identify an overlapping coefficient between the incumbent ML model and the successor ML model by measuring an area of overlap between the score distributions thereof, in some embodiments. It shall be noted that S232 may alternatively measure an area of non-overlapping segments of the score distributions and/or the overlapping coefficient in any suitable manner. In a preferred embodiment, once S231 builds a score distribution for each of the incumbent and successor ML models, S232 may function to superimpose the score distribution of the successor model onto the score distribution of the incumbent model such that the overlapping and non-overlapping segments between the two score distributions are illustrated in a single or unitary view. For example, based on an evaluation of the pairwise comparison of the score distribution of the successor ML model superimposed onto the score distribution of the incumbent ML model, S232 may measure a 90% overlap between the areas under the score distribution curves of the successor ML model and the incumbent ML models. In such example, S232 may alternatively identify a 10% non-overlap which may indicate a 10% variance or a 10% shift in threat score values of the successor ML model relative to the threat score values of the incumbent ML model.

It shall be noted that S232 may function to perform any suitable pairwise comparison between the score distributions of the incumbent and successor ML models. Thus, while it may be helpful to overlap illustrations of the score distributions of each of the incumbent and successor ML models, S232 may perform variance analysis between the two score distributions in any suitable manner or using any suitable paired evaluation technique.

Additionally, or alternatively, S230 includes S233, which includes identifying whether a measured variance (in S232) amounts to an anomalous shift, functions to evaluate the measured variance between a score distribution of the incumbent ML model and a score distribution of the successor ML model to determine whether the measured variance of score distribution of the successor ML model comprises an anomalous shift.

In a preferred embodiments, S233 may function to assess the measured variance value against one or more anomalous shift thresholds to determine whether the measured variance value should be classified as an anomalous shift. The one or more anomalous shift thresholds may be predetermined values derived based on well-developed statistical thresholds. However, in some embodiments, the one or more anomalous shift thresholds may be dynamically based on customer-specific data (e.g., historical data) and may be changed for different customers or may be changed based on other factors relating to seasonal events or the like.

Accordingly, if S233 assesses that the measured variance between the score distributions of the successor ML model and the incumbent ML model does not satisfy the one or more anomalous shift thresholds, S233 may function to pass the successor ML model to be validated and/or deployed into a live threat scoring model or permanently deployed into a live threat scoring model. Alternatively, if S233 assesses that the measured variance between the score distributions of the successor ML model and the incumbent ML model satisfies at least one of the one or more anomalous shift thresholds, S233 may function to determine or initialize a further evaluation to determine whether the anomalous shift is an unexpected anomalous shift for a given customer or service provider.

4.3.2 Anomalous Shifts in Confidence Interval

In a second implementation, S230 may function to implement anomalous shift detection analysis by detecting changes or shifts in a confidence interval of the threat scores of the successor ML model relative to a confidence interval of the threat scores of the incumbent ML model.

In this first implementation, S230 includes S234, which functions to generate a confidence interval for each of the incumbent and the successor ML models. Specifically, S231 may function to estimate/compute confidence intervals and plot a confidence interval curve for each of the incumbent and successor ML models based on a sampling of the collected digital threat scores for each of the incumbent and successor ML models. In some embodiments of the present application, S234 may function to use bootstrapping techniques for both estimating and computing confidence intervals. Generally, bootstrapping includes a method that (randomly) samples an empirical distribution of threat scores to approximate the statistics of the underlying distribution. As an example, in or more embodiments of the present application, S234 may function to estimate a distribution of a sample mean of the threat score values for either or both of the incumbent threat scores and the successor threat scores instead of using t-statistic to build the estimate. In this example, resampling or the like may be used to derive the distribution of the sample mean of the threat scores. Thus, S234 may function to implement bootstrapping analysis for detecting percentile changes in the threat scores of the successor ML model relative to the threat scores of the incumbent ML model. S234 may additionally or alternatively implement percentile estimation technique for detecting percentile changes in the threat scores of the successor ML model relative to the threat scores of the incumbent ML model.

Additionally, or alternatively, S234 may function to implement two-sample Kolmogorov-Smirnov test to compare two samples with reference probability distributions. In such embodiments, KS may function to quantify a distance or variance between two empirical distributions, namely between a successor threat score distribution and incumbent threat score distribution. Accordingly, the quantified distance between the distributions may be measured against an anomalous shift threshold to determine whether there is an anomalous shift in the successor threat scores.

Additionally, or alternatively, S234 may function to implement Anderson-Darling test for non-parametric k-sample testing to measure an agreement between two disparate distributions, namely an agreement between a successor threat score distribution and incumbent threat score distribution. Accordingly, the measured agreement between the distributions may be assessed against an anomalous shift threshold to determine whether there is an anomalous shift in the successor threat scores.

Figure 9:
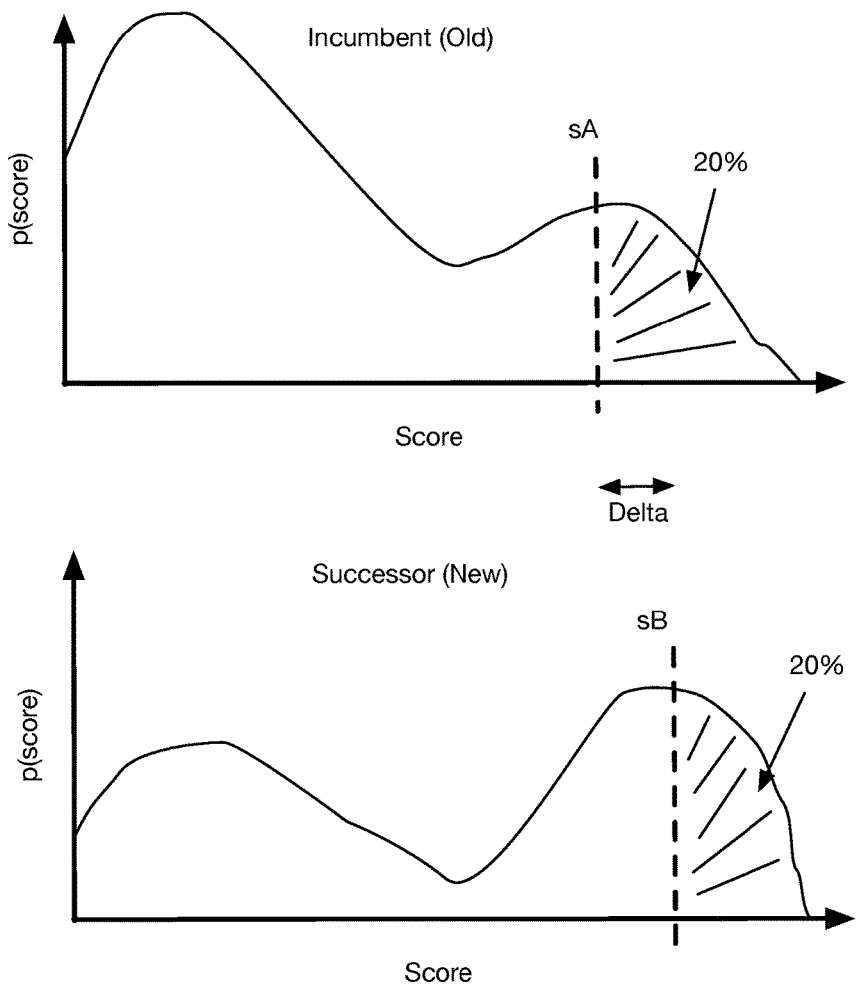
FIG. 9 illustrates an example anomalous shift detection based on a difference in population differences for a given percentile between an old and new model in accordance with one or more embodiments of the present application.

Additionally, or alternatively, S230 may include S235, which includes measuring variances between confidence intervals, functions to identify whether there is a measurable point shift at any percentile in the confidence interval of the successor ML model relative to the confidence interval of the incumbent ML model. Accordingly, in a preferred embodiment, S235 may function to select a score threshold along the confidence interval curve of the incumbent ML model and determine a size of a population of threat score samples that exist beyond the selected score threshold of the confidence interval curve of the incumbent ML model. In such preferred embodiment, S235 may function to identify a score threshold on the confidence interval curve of the successor ML model at which a comparably-sized (or same-sized) population of threat score samples of the successor ML model exist beyond. For example, at a 0.95 score threshold, 20% of a population of threat scores produced by an incumbent ML model may exist beyond the 0.95 score threshold. In such example, a comparably-sized 20% of a population of threat scores produced by the successor ML model may exist in a range beyond the 0.90 score threshold of the confidence interval curve of the successor ML model, as shown by way of example in FIG. 9. Thus, in this example, there is a 5 point (0.05) disparity between the confidence intervals of the successor ML model and the incumbent ML model.

In a variant of S235, S235 may function to compute a measured variance value by selecting a same score threshold at the confidence interval curves of each of the incumbent ML model and the successor ML model and measure a population of the threat scores for each of the incumbent ML model and the successor ML model beyond the selected score threshold. In this variant, S235 may function to measure a percent (or an amount) difference between the population of threat scores of the incumbent ML model and the population of threat scores of the successor ML model at the selected score threshold.

Figure 8:
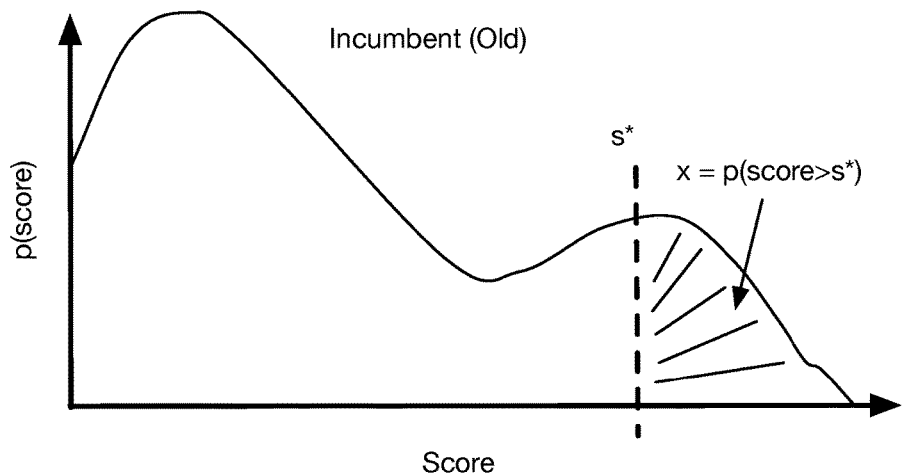
FIG. 8 illustrates an example anomalous shift detection based on a difference in confidence intervals between an old and new model in accordance with one or more embodiments of the present application.
Figure 8:
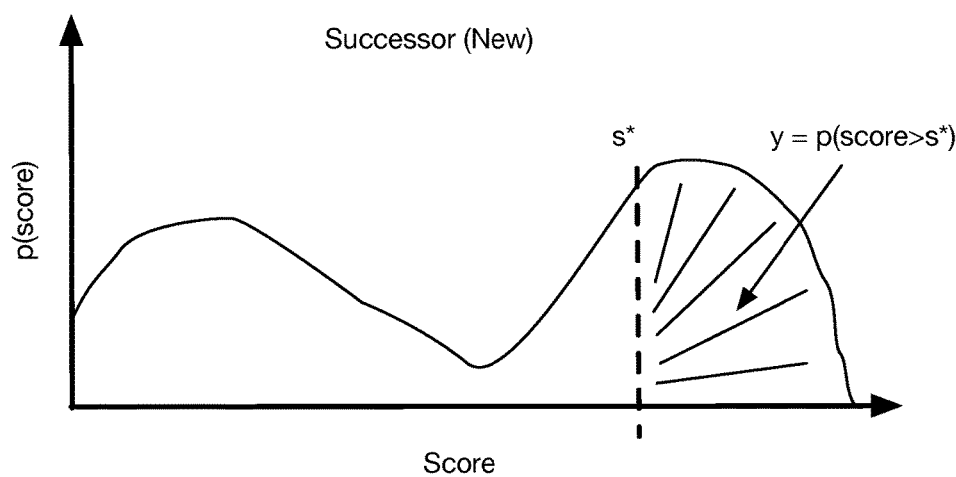

In some embodiments, the population of successor digital threat scores beyond the selected score threshold of the successor confidence interval represent a percentage of a total population of users associated with the service provider whose online activity would be blocked if the successor ML model were used to produce digital threat scores, as shown by way of example in FIG. 8. Similarly, the population of incumbent digital threat scores beyond the selected score threshold of the incumbent confidence interval represent a percentage of a total population of users associated with the service provider whose online activity would be blocked if using the incumbent ML model.

In such embodiments, identifying an anomalous shift in the threat scores of the successor ML model is based on changes in the percentage of users blocked or changes in the blocked rate by the successor ML model relative to the percentage of users blocked or blocked rate by the incumbent ML model. In a preferred embodiment, S230 may function to measure a difference value between a ratio or a blocked rate of the incumbent model beyond a score threshold and a ratio or a blocked rate of the successor model beyond the score threshold. Additionally, or alternatively, S230 may function to measure a percentage difference value between the percentage of the total population of users blocked by the incumbent digital threat ML model and the percentage of the total population of users blocked by the successor digital threat ML model. If the percentage difference value or the difference value between the blocked rates meets or exceeds an anomalous shift threshold, then S230 may function to identify the scoring outputs and/or a behavior of the successor ML model as being anomalous with respect to threat scores produced for a given customer and/or service provider.

Once a comparable score threshold is identified along the confidence interval curve of the successor ML model, S235 may function to measure a variance or difference in value between the selected score threshold of the incumbent ML model and the comparable (in terms of population size) score threshold of the successor ML model.

Additionally, or alternatively, S230 includes S236, which includes identifying whether a measured variance (in S235) amounts to an anomalous shift, functions to evaluate the measured variance between the confidence interval curves of the incumbent ML model and the successor ML model to determine whether the measured variance comprises an anomalous shift.

In a preferred embodiments, S236 may function to assess the measured variance value against one or more anomalous shift thresholds to determine whether the measured variance value should be classified as an anomalous shift. The one or more anomalous shift thresholds may be predetermined values derived based on well-developed statistical thresholds. However, in some embodiments, the one or more anomalous shift thresholds may be dynamically based on customer-specific data (e.g., historical data) and may be changed for different customers or may be changed based on other factors relating to seasonal events or the like.

Accordingly, if S236 assesses that the measured variance between the confidence interval curves of the incumbent ML model and the successor ML model does not satisfy the one or more anomalous shift thresholds, S236 may function to pass the successor ML model to be validated and/or deployed into a live threat scoring model or permanently deployed into a live threat scoring model. Alternatively, if S236 assesses that the measured variance between the confidence interval curves of the incumbent ML model and the successor ML model satisfies at least one of the one or more anomalous shift thresholds, S236 may function to initialize a further evaluation to determine whether the anomalous shift is an unexpected anomalous shift for a given customer or service provider.

4.3.3 Detecting an Unexpected Anomalous Shift

Optionally, or additionally, S240, which includes identifying an unexpected anomalous shift, functions to identify an anomalous behavior and/or outputs of a successor ML model based on historical shift data. In a preferred embodiment, S240 may function to identifying historical shift data for a given customer and/or service provider where the historical shift data may include data relating to historical anomalous shifts of prior successor ML models implemented for producing digital threat scores for the given customer and/or service provider. Accordingly, in some embodiments, one or more of the prior or historical successor ML models may have been deployed in a live mode for producing threat scores exposable to the service provider and in other instances, the one or more of the prior successor ML models may not have been deployed but maintained in a nascent state for the given service provider.

S240 may function to retrieve the historical shift data based on a customer and/or service provider identifier or using any suitable data. In a preferred embodiment, the historical shift data for a given customer includes a threat score distribution of the one or more prior successor ML models. In such preferred embodiment, S240 may function to perform pairwise analysis between the threat score distribution the current successor ML model and each of the threat score distributions of prior successor ML models to determine whether anomalous shift of the current successor ML model is consistent with the historical shifts or diverges from the historical shifts.

In some embodiments, if it is determined that the anomalous shift of the current successor ML model is consistent with (e.g., does not exceed a predetermined variance threshold) the historical shifts of prior successor ML models, then S240 may function to determine that the anomalous shift in the current successor ML model is an expected anomalous shift. However, if it is determined that the anomalous shift of the current successor ML model is inconsistent with (e.g., meets or exceeds a predetermined variance threshold) the historical shifts of prior successor ML models, then S240 may function to determine that the anomalous shift in the current successor ML model is an unexpected anomalous shift.

It shall be noted that S240 may perform any suitable comparison techniques including suitable statistical evaluation methods and methods described in S230 to determine metrics for evaluating whether an anomalous shift of a current successor ML model is expected or unexpected.

4.4 Validating/Deployment of a Successor Model

S250, which includes validating or not and/or deploying a successor ML model, functions to evaluate anomalous shift data including any calculated or derived anomalous shift metrics to determine whether or not a successor ML model can be deployed with minimal or no disruption to threat score generation for one or more given customers and/or service providers.

In one embodiment, S250 may analyze the anomalous shift data for a given successor ML model and determine that no anomalous shift in threat scores are apparent for a given customer of the digital threat mitigation service. In such circumstance, S250 may function to move an operation of the successor ML model from a shadow operation mode to a live operation mode. In one implementation, S250 may function to switch an operation mode of the successor ML model from the shadow mode to the live mode by updating a live ensemble of machine learning models or the like used in generating live digital threat scores for customers and/or service providers. In such implementation, S250 may function to update the live ensemble of machine learning models by replacing a corresponding or cognate incumbent ML model with the validated successor ML model. In another implementation, S250 may function to switch an operation mode of the successor ML model from the shadow mode to the live mode by updating a live ensemble of machine learning models to include the validated successor ML model. In such implementation, S250 may function to augment the live ensemble of machine learning models with the validated successor ML model without necessarily replacing or deleting the corresponding or cognate incumbent ML model from the live ensemble. Rather, in some embodiments, S250 may function to migrate the incumbent ML model from the live ensemble over time after the validated successor ML model has been installed into the live ensemble.

In some embodiments, S250 may analyze the anomalous shift data for a given successor ML model and determine that an anomalous shift in threat scores is apparent for a given customer of the digital threat mitigation service.

Depending on a degree or a level of the anomalous shift that was detected in the threat scores for the successor ML model, S250 may function to automatically deploy the validated successor ML model into live operation (e.g., returning exposable threat scores) or delay a live deployment of the successor ML model. In the circumstance of an automatic deployment of the successor ML model, S250 may function to evaluate calculate a level or degree of autonomous shift based on the anomalous shift data and compare the calculated level or degree of anomalous shift to a predetermined deployment threshold. If the level or degree of anomalous shift satisfies the predetermined deployment threshold, then S250 may automatically trigger the live deployment of the successor ML model. Conversely, if the level or degree of anomalous shift for the successor ML model does not satisfy the deployment threshold, then S250 may function to delay a deployment of the successor ML model until one or more deployment criteria.

The one or more deployment criteria may include any process or protocol that enables a customer or service provider to recognize and/or prepare one or more of their evaluation and/or decisioning criteria (e.g., decision threshold) based on the anomalous shift data. Thus, the one or more deployment criteria may include a mere passage of time since a customer has been informed of the anomalous shift, an adjustment of one or more decisioning thresholds by the customer and/or service that may be affected by the deployment of the successor ML model, and/or merely informing or reporting to a customer and/or service provider of impending anomalous shift n threat score.

In some embodiments, S250 may analyze the anomalous shift data for a given successor ML model and determine that an unexpected anomalous shift in threat scores is apparent for a given customer of the digital threat mitigation service. In such embodiments, S250 may function to automatically block a live deployment of the successor ML model. Additionally, or alternatively, S250 may function to calibrate the successor ML model to mitigate or eliminate the unexpected anomalous shift, as described in more detail in U.S. patent application Ser. No. 15/941,175, which is incorporated herein in its entirety by this reference. Accordingly, if or once the successor ML model has been calibrated, S250 may function to validate the successor ML model and further, deploy the calibrated and validated successor ML model into a live implementation for returning digital threat scores.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A machine learning system for deploying a machine learning model for predicting and/or classifying digital fraud or digital abuse, the system comprising:
   one or more computing server devices that implement a remote machine learning service that collects, via one or more networks, digital event data associated with one or more online services of a service provider, wherein the remote machine learning service implements:
      a machine learning model validation system that:
         collects incumbent digital threat scores generated by an incumbent machine learning model and successor digital threat scores generated by a successor digital threat machine learning (ML) model;
         implements anomalous-shift-detection that detects whether the successor digital threat scores of the successor digital threat ML model produces an anomalous shift, wherein the anomalous shift relates to a measurable variance in values of the successor digital threat scores of the successor digital threat ML model relative to values of the incumbent digital threat scores of the incumbent digital threat ML model, and wherein the anomalous-shift detection includes:
      building a successor threat score distribution based on the successor digital threat scores generated by the successor digital threat ML model;
      building an incumbent threat score distribution based on the incumbent digital threat score generated by the incumbent digital threat ML model; and
      identifying an overlapping coefficient between an area under a curve of the successor threat score distribution and an area under a curve of the incumbent threat score distribution;
         if the anomalous shift is detected by the machine learning model validation system:
            blocks a deployment of the successor digital threat model to a live ensemble of digital threat scoring models that generate digital threat scores based on the collected digital event data associated with the one or more online services of the service provider; or
         if the anomalous shift is not detected by the machine learning model validation system, deploys the successor digital threat ML model by replacing the incumbent digital threat ML model in a live ensemble of digital threat scoring models with the successor digital threat ML model.

2. The system according to claim 1, wherein
the anomalous shift further includes:
   determining whether the anomalous shift exists in the successor threat score distribution relative to the incumbent threat score distribution based on an assessment of the overlapping coefficient against an anomalous shift threshold,
   wherein the anomalous shift exists in the successor threat score distribution if the overlapping coefficient satisfies or exceeds the anomalous shift threshold.

3. The system according to claim 1, wherein
the anomalous-shift detection includes:
  building a successor confidence interval based on the successor digital threat scores generated by the successor digital threat ML model;
  building an incumbent confidence interval based on the incumbent digital threat score generated by the incumbent digital threat ML model;
  evaluating a same confidence level at each of the successor confidence interval and the incumbent confidence interval;
  measuring a population of successor digital threat scores beyond the same confidence level of the successor confidence interval; and
  measuring a population of incumbent digital threat scores beyond the same confidence level of the incumbent confidence interval; and
  calculating a percentage difference value between the measured population of successor digital threat scores and the measured population of the incumbent digital threat score.

4. The system according to claim 1, wherein
the anomalous-shift detection includes:
  determining whether the anomalous shift exists in the successor digital threat scores relative to the incumbent digital threat scores based on an assessment of the percentage difference value against an anomalous shift threshold,
  wherein the anomalous shift exists in the successor threat score distribution if the percentage difference value satisfies or exceeds the anomalous shift threshold.

5. The system according to claim 1, wherein:
the remote machine learning service collects the digital event data associated with the one or more online services of the service provider via an application programming interface (API),
the API routes a first portion of the digital event data to the incumbent digital threat ML model, and
the API routes a second portion of the digital event data to the successor digital threat ML model, wherein the second portion comprises a predetermined percentage of a total traffic of digital event data collected by the API.

6. The system according to claim 1, wherein
the remote machine learning service:
  operates the incumbent digital threat ML model in a live mode in which the incumbent digital threat ML model produces digital threat scores that are publicly exposed to the service provider;
  operates the successor digital threat ML model in a shadow mode in which the successor digital threat ML model produces digital threat scores that are not publicly exposed to the service provider.

7. The system according to claim 6, wherein:
the remote machine learning service collects the digital event data associated with the one or more online services of the service provider via an application programming interface (API),
the API routes the digital event data to the incumbent digital threat ML model while operating in the live mode, and
the API routes a copy of the digital event data to the successor digital threat ML model while operating in the shadow mode.

8. The system according to claim 1, wherein:
if the anomalous shift is detected by the machine learning model validation system, identifying whether the anomalous shift comprises an unexpected anomalous shift, and
the anomalous shift comprises the unexpected anomalous shift when a measured difference value between the anomalous shift of the successor digital threat ML model and a historical anomalous shift of a prior successor digital threat ML model satisfies or exceeds an unexpected anomalous shift threshold.

9. The system according to claim 1, wherein
the incumbent digital threat ML model comprises an active machine learning model that operates to generate digital threat scores that are exposable to the service provider.

10. The system according to claim 1, wherein:
the successor digital threat ML model comprises a nascent machine learning model that operates to generate digital threat scores that are not exposable to the service provider, and
if validated by the machine learning validation system, replaces the incumbent digital threat ML model.

11. The system according to claim 6, wherein:
the remote machine learning service collects the digital event data associated with the one or more online services of the service provider via an application programming interface (API),
the API routes paired data from the digital event data to the incumbent digital threat ML model while operating in the live mode,
the paired data comprises a corpus of digital event data relating to online activities of a same set of users, and
the API routes the paired data to the successor digital threat ML model while operating in the shadow mode.

12. A machine learning system for deploying a machine learning model for predicting and/or classifying digital fraud or digital abuse, the system comprising:
  one or more computing server devices that implement a remote machine learning service that collects, via one or more networks, digital event data associated with one or more online services of a service provider, wherein the remote machine learning service implements:
    an application programming interface that:
      sources paired data from the digital event data to the incumbent digital threat ML model;
      sources paired data from a copy of the digital event data to the incumbent digital threat ML model, wherein the paired data from the digital event data and from the copy of the digital event data comprises data relating to online activities of a same set of users;
    a machine learning model validation system that:
      collects incumbent digital threat scores generated by an incumbent machine learning model and successor digital threat scores generated by a successor digital threat machine learning (ML) model;
      implements anomalous-shift-detection that detects whether the successor digital threat scores of the successor digital threat ML model produces an anomalous shift, wherein the anomalous shift relates to a measurable variance in values of the successor digital threat scores of the successor digital threat ML model relative to values of the incumbent digital threat scores of the incumbent digital threat ML model, and wherein the anomalous-shift detection includes:

building a successor threat score distribution based on the successor digital threat scores generated by the successor digital threat ML model;

building an incumbent threat score distribution based on the incumbent digital threat score generated by the incumbent digital threat ML model; and identifying an overlapping coefficient between an area under a curve of the successor threat score distribution and an area under a curve of the incumbent threat score distribution;

if the anomalous shift is detected by the machine learning model validation system:

blocking a validation of the successor digital threat ML model; and blocking a deployment of the successor digital threat model to a live ensemble of digital threat scoring models that generate digital threat scores based on the collected digital event data associated with the one or more online services of the service provider;

or if the anomalous shift is not detected by the machine learning model validation system, deploying the successor digital threat ML model by replacing the incumbent digital threat ML model in a live ensemble of digital threat scoring models with the successor digital threat ML model.

13. The system according to claim 12, wherein the anomalous-shift detection includes:

computing an area under the curve for the successor threat score distribution for successor threat score values beyond a predetermined score threshold along the area under the curve for the successor digital threat ML model; and computing an area under the curve for the incumbent threat score distribution for incumbent threat score values beyond the predetermined score threshold along the area under the curve for the incumbent digital threat ML model.

14. The system according to claim 13, wherein the anomalous shift further includes:

determining whether the anomalous shift exists in the successor threat score distribution relative to the incumbent threat score distribution based on an assessment of the overlapping coefficient against an anomalous shift threshold, wherein the anomalous shift exists in the successor threat score distribution if the overlapping coefficient satisfies or exceeds the anomalous shift threshold.

15. A method of deploying a machine learning model for predicting and/or classifying digital fraud or digital abuse, the method comprising:

using one or more computing server devices to implement a remote machine learning service that collects, via one or more networks, digital event data associated with one or more online services of a service provider;

collecting incumbent digital threat scores generated by an incumbent machine learning model and successor digital threat scores generated by a successor digital threat machine learning (ML) model;

implementing by the remote machine learning service anomalous-shift-detection that detects whether the successor digital threat scores of the successor digital threat ML model produces an anomalous shift, wherein the anomalous shift relates to a measurable variance in values of the successor digital threat scores of the successor digital threat ML model relative to values of the incumbent digital threat scores of the incumbent digital threat ML model, and wherein the anomalous-shift detection includes:

building a successor threat score distribution based on the successor digital threat scores generated by the successor digital threat ML model;

building an incumbent threat score distribution based on the incumbent digital threat score generated by the incumbent digital threat ML model; and identifying an overlapping coefficient between an area under a curve of the successor threat score distribution and an area under a curve of the incumbent threat score distribution;

if the anomalous shift is detected by the machine learning model validation system, blocking a deployment of the successor digital threat model to a live ensemble of digital threat scoring models that generate digital threat scores based on the collected digital event data associated with the one or more online services of the service provider;

or if the anomalous shift is not detected by the machine learning model validation system, deploying the successor digital threat ML model by replacing the incumbent digital threat ML model in a live ensemble of digital threat scoring models with the successor digital threat ML model.

16. The method according to claim 15, wherein the anomalous shift further includes:

determining whether the anomalous shift exists in the successor threat score distribution relative to the incumbent threat score distribution based on an assessment of the overlapping coefficient against an anomalous shift threshold, wherein the anomalous shift exists in the successor threat score distribution if the overlapping coefficient satisfies or exceeds the anomalous shift threshold.

* * * * *

UNITED STATES PATENT AND TRADEMARK OFFICE
CERTIFICATE OF CORRECTION

PATENT NO. : 10,341,374 B1
APPLICATION NO. : 16/196242
DATED : July 2, 2019
INVENTOR(S) : Sadaghiani et al.

Page 1 of 1

It is certified that error appears in the above-identified patent and that said Letters Patent is hereby corrected as shown below:

In the Claims

Column 21, Line 14:
In Claim 3, after "interval;", delete "and"

Signed and Sealed this
Eighteenth Day of February, 2020

Andrei Iancu
*Director of the United States Patent and Trademark Office*